(12) United States Patent
De Carteret et al.

(10) Patent No.: US 8,051,687 B2
(45) Date of Patent: Nov. 8, 2011

(54) TRACTION STEER DETECTION AND COMPENSATION

(75) Inventors: David T. De Carteret, Howell, MI (US); Larry G. Gepfrey, Wiesbaden-Rambach (DE); Gregory K. Peterson, South Lyon, MI (US); Mark S. Hogle, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1042 days.

(21) Appl. No.: 11/932,460

(22) Filed: Oct. 31, 2007

(65) Prior Publication Data

US 2009/0112436 A1 Apr. 30, 2009

(51) Int. Cl.
*G06F 17/00* (2006.01)
(52) U.S. Cl. .................. 70/83; 701/50; 701/83; 701/90; 180/6.2; 180/6.7; 180/9.36; 180/9.38; 180/6.36; 280/400; 477/1; 475/23
(58) Field of Classification Search ............... 701/50, 701/83, 90; 180/6.2, 6.7, 9.36, 9.38, 6.36, 180/6.66, 6.38, 6.44, 19.1, 19.2, 19.3, 13, 180/6.48, 197, 211, 215, 235, 242, 244, 307, 180/308; 280/400; 475/23; 477/1
See application file for complete search history.

(56) References Cited

U.S. PATENT DOCUMENTS

| | | | | |
|---|---|---|---|---|
| 4,583,611 A | * | 4/1986 | Frank et al. | 180/197 |
| 4,733,760 A | * | 3/1988 | Inagaki et al. | 477/185 |
| 4,750,125 A | * | 6/1988 | Leppek et al. | 701/83 |
| 5,047,940 A | * | 9/1991 | Onaka et al. | 701/87 |
| 5,102,202 A | * | 4/1992 | Breen | 303/7 |
| 5,140,524 A | * | 8/1992 | Matsuda | 701/72 |
| 5,193,888 A | * | 3/1993 | Okazaki et al. | 303/163 |
| 5,263,548 A | * | 11/1993 | Tsuyama et al. | 180/197 |
| 5,322,356 A | * | 6/1994 | Kolbe et al. | 303/139 |
| 5,429,428 A | * | 7/1995 | Yasuda | 303/139 |
| 5,732,376 A | * | 3/1998 | Hrovat et al. | 701/80 |
| 5,804,935 A | * | 9/1998 | Radev | 318/139 |
| 5,825,213 A | * | 10/1998 | Barrett et al. | 327/105 |

(Continued)

FOREIGN PATENT DOCUMENTS

DE 69614362 T2 11/2001

(Continued)

OTHER PUBLICATIONS

German Office Action for German Patent Application 102008053424.2 mailed Mar. 22, 2011.

(Continued)

*Primary Examiner* — James Trammell
*Assistant Examiner* — McDieunel Marc
(74) *Attorney, Agent, or Firm* — Ingrassia Fisher & Lorenz P.C.

(57) ABSTRACT

A system, method, and computer program product for detecting and compensating for a traction steer event is provided. A first wheel speed of a first driven wheel is compared with a second wheel speed of a second driven wheel to determine whether a wheel slip condition has occurred. If a wheel slip condition is determined to have occurred, a current operating state of a vehicle is compared to an expected operating state of the vehicle to determine if a traction steer event has occurred. If a traction steer event is determined to have occurred, brake pressure is selectively applied to the first or second driven wheel to compensate for the traction steer event.

20 Claims, 2 Drawing Sheets

U.S. PATENT DOCUMENTS

| | | | |
|---|---|---|---|
| 6,005,358 A * | 12/1999 | Radev | 318/139 |
| 6,125,961 A * | 10/2000 | Matsufuji | 180/233 |
| 6,262,551 B1 * | 7/2001 | Clark | 318/587 |
| 6,520,601 B1 * | 2/2003 | Kahl et al. | 303/167 |
| 6,575,870 B2 * | 6/2003 | Kitano et al. | 477/3 |
| 6,595,602 B2 * | 7/2003 | Jokic et al. | 303/146 |
| 6,952,635 B2 | 10/2005 | Yasui et al. | |
| 7,568,274 B2 * | 8/2009 | Yoneda et al. | 29/458 |
| 7,591,342 B2 * | 9/2009 | Ozsoylu et al. | 180/444 |
| 7,970,513 B2 * | 6/2011 | Yasui et al. | 701/41 |
| 2002/0013194 A1 * | 1/2002 | Kitano et al. | 477/3 |
| 2002/0189889 A1 * | 12/2002 | Demerly | 180/402 |
| 2002/0198646 A1 | 12/2002 | Bedner et al. | |
| 2003/0062770 A1 * | 4/2003 | Sasaki et al. | 303/152 |
| 2004/0199321 A1 * | 10/2004 | Lin et al. | 701/70 |
| 2006/0155457 A1 * | 7/2006 | Waldbauer et al. | 701/72 |
| 2006/0158031 A1 * | 7/2006 | Kummel et al. | 303/146 |
| 2006/0208564 A1 | 9/2006 | Yuda et al. | |
| 2006/0276289 A1 * | 12/2006 | Hirata et al. | 475/5 |
| 2007/0131476 A1 * | 6/2007 | Kubokawa et al. | 180/444 |
| 2007/0289808 A1 * | 12/2007 | Yasui et al. | 180/446 |
| 2009/0115246 A1 * | 5/2009 | Yanagida et al. | 303/144 |

FOREIGN PATENT DOCUMENTS

| | | |
|---|---|---|
| DE | 60300375 T2 | 2/2006 |
| DE | 102006011921 A1 | 11/2006 |

OTHER PUBLICATIONS

Automotive Handbook. 26th Edition. Wiesbaden: Vieweg, Jan. 2007: p. 854, ISBN 855-978-3-834830138-8.

Vehicle Stability Systems. 1st Edition. Plochingen: Robert Bosch GmbH, 2004. p. 44-49. ISBN-978-3865220158.

* cited by examiner

TRACTION STEER DETECTION AND COMPENSATION

TECHNICAL FIELD

The present invention generally relates to automotive control systems, and more particularly relates to a method and a system used in a vehicular setting for detection and compensation of traction steer.

BACKGROUND OF THE INVENTION

Traction steer, or more broadly, torque steer, is a phenomenon that describes a steering moment generated about a vehicle's kingpin axes that is of sufficient size to overcome the typical forces that return a steering wheel toward the straight-ahead position. Such a steering moment may be caused by a tire having more traction during acceleration than the opposing tire. The resulting net force in the steering rack generates a decrease in steering wheel centering torque, and possibly results in a positive steering wheel torque in a direction that is not desired by the driver.

It is desirable to control traction steer in vehicles to the extent possible. Various methodologies to identify and compensate for traction steer have been proposed. For example, one method limits torque to a predefined level in first gear. When the accelerator pedal position is depressed to the extent that the driver is requesting more torque than the predefined level, only the maximum allowed torque is produced by the engine.

The above example method describes a passive compensation system, in that the vehicle torque is reduced arbitrarily, without regard to whether a traction steer event is occurring. Accordingly, a need exists for a more effective traction steer identification and compensation system and method. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In one embodiment, by way of example only, a method for detecting and compensating for a traction steer event is provided. A first wheel speed of a first driven wheel is compared with a second wheel speed of a second driven wheel to determine whether a wheel slip condition has occurred. If a wheel slip condition is determined to have occurred, a current operating state of a vehicle is compared to an expected operating state of the vehicle to determine if a traction steer event has occurred. If a traction steer event is determined to have occurred, brake pressure is selectively applied to the first or second driven wheel to compensate for the traction steer event.

In another embodiment, again by way of example only, a system for detecting and compensating for a traction steer event is provided. The system implements means for comparing a first wheel speed of a first driven wheel with a second wheel speed of a second driven wheel to determine whether a wheel slip condition has occurred is provided. If a wheel slip condition is determined to have occurred, the system implements means for comparing a current operating state of a vehicle to an expected operating state of the vehicle to determine if a traction steer event has occurred. If a traction steer event is determined to have occurred, the system implements means for selectively applying brake pressure to the first or second driven wheel to compensate for the traction steer event.

In still another embodiment, again by way of example only, a computer program product for detecting and compensating for a traction steer event is provided. The computer program product comprises a computer-readable storage medium having computer-readable program code portions stored therein. The computer-readable program code portions comprise a first executable portion for comparing a first wheel speed of a first driven wheel with a second wheel speed of a second driven wheel to determine whether a wheel slip condition has occurred, a second executable portion for, if a wheel slip condition is determined to have occurred, comparing a current operating state of a vehicle to an expected operating state of the vehicle to determine if a traction steer event has occurred, and a third executable portion for, if a traction steer event is determined to have occurred, selectively applying brake pressure to the first or second driven wheel to compensate for the traction steer event.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following description presents a novel system and method for effectively identifying and compensating for traction steer. A wheel speed of a first driven wheel of the vehicle is compared against a wheel speed of a second driven wheel of the vehicle to make an initial determination that a wheel slip condition exists. Use of the term "driven" may refer to a wheel driven by the engine (e.g., a wheel connected to the drivetrain). Such a wheel slip condition may occur when, while a vehicle is turning, an inside wheel slips more than a threshold amount relative to an outside wheel.

If a wheel slip condition is discovered, a variety of vehicle parameters may be examined to compare a current state of a respective parameter versus an expected state of the parameter. If one or more of these state comparisons exceeds a threshold, a traction steer event may be then identified.

If a traction steer event is determined to have occurred, then brake pressure may be applied to at least one of the vehicle's wheels to slow a wheel that is rotating at a faster rate than another wheel. On a supplemental basis, the vehicle engine may be directed to reduce torque applied to the wheels.

Figure 1:
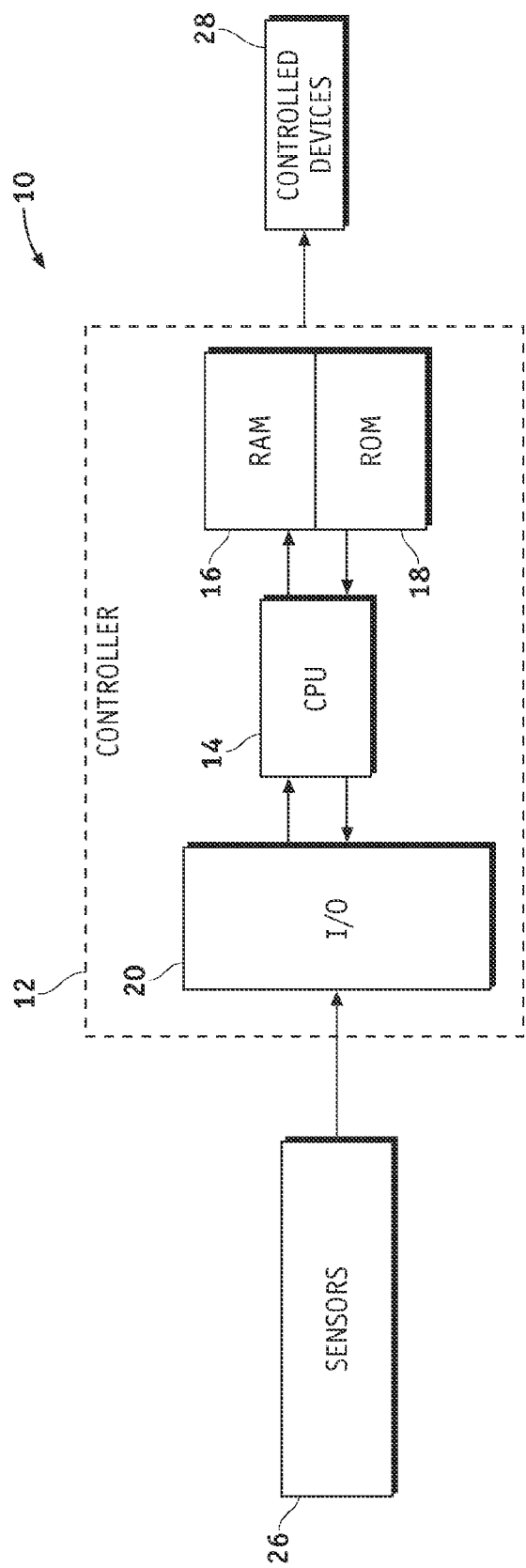
FIG. 1 is a block diagram of a system for detecting and compensating for traction steer.

FIG. 1 illustrates an exemplary system 10 for detecting a traction steer event. Once a traction steer event is detected, system 10 may then direct various components of the vehicle to compensate for the traction steer event. A processor/controller device 12 includes a central processing unit (CPU) 14 coupled to memory devices 16 and 18, which can include such memory as random access memory (RAM) 16, nonvolatile read only memory (NVROM) 18, and possibly other mass storage devices. CPU 14 is coupled through an input/output (I/O) interface 20 to at least one of a plurality of sensors 26 which provide operational data from a vehicle, such as wheel speed, to the CPU 14. Sensors 26 may be configured to measure various operational parameters of the vehicle as will be further described.

Figure 2:
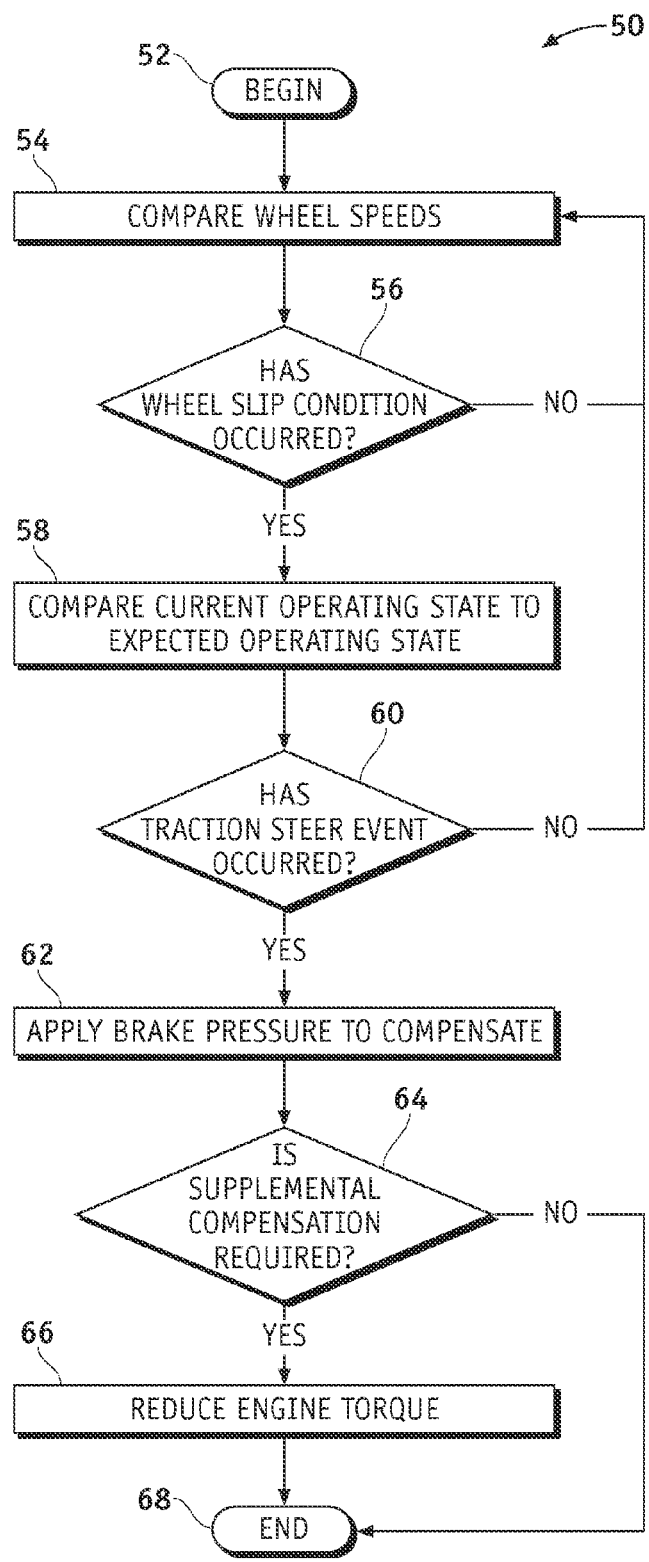
FIG. 2 is a flow chart diagram of an exemplary method of detecting and compensating for traction steer.

FIG. 2 illustrates an exemplary method 50 for determining a traction steer event and compensating for such an event. Method 50 begins (step 52) by first comparing a wheel speed of a first wheel with a wheel speed of a second wheel (step 54). The wheel speed may be measured using a wheel speed sensor 26 (FIG. 1) associated with each of the wheels of the vehicle.

Wheel speed may be an early indicator of potential traction steer. The wheel speeds may be continuously monitored to determine if undesired slip conditions exist. The slip conditions may occur when an inside wheel slips more than a predetermined threshold relative to an outside wheel as measured while the vehicle is turning. For example, during a vehicle turn, an inside wheel may be measured by a wheel speed sensor as having a wheel speed of about 30.5 miles per hour. The outside wheel, however, during the same period of time, may be measured by another wheel speed sensor as having a wheel speed of about 29.5 miles per hour. The difference between the outside wheel speed and the inside wheel may be larger than a predetermined threshold amount of about 0.50 miles per hour. Again, such wheel speed measurements and threshold amounts are merely exemplary in nature. One skilled in the art will appreciate that various measurements and threshold amounts may be utilized in a specific application.

If such a predetermined threshold amount is exceeded as described, then a wheel slip condition is determined to have occurred (step 56). If such a predetermined threshold amount is not exceeded as described, the system determines that a wheel slip condition has not occurred. In the depicted embodiment, the system then continues to monitor wheel speeds (step 54).

If a wheel slip condition is detected, the system then compares at least one current operating state of the vehicle to an expected operating state (step 58). This comparison of current versus expected relates specifically to the comparison of various operating parameters of the vehicle, as will be further described. Accordingly, the system may compare one or more current operating parameters with a predetermined expected operating parameter.

Based on one or more comparisons between a current and an expected operating parameter, the system may determine that a significant enough difference exists between a predetermined number and/or type of parameters to validate that a traction steer event has begun to occur (step 60). If a threshold difference is not found, the system may continue to monitor wheel speeds (again, step 54).

If a traction steer event is found, the system then applies brake pressure to compensate for the traction steer (step 62). As will be described below, the system may, in one embodiment, apply brake pressure specifically to the wheel of the vehicle having the greatest wheel slippage. In other embodiments, the system may apply brake pressure to the slower rotating wheel. Application of brake pressure to the slower rotating wheel results in torque being diverted to the vehicle's brake system and delivered to the ground. The effectiveness of either method (application of brake pressure to the wheel of the vehicle having the greatest wheel slippage and application of brake pressure to the slower rotating wheel of the vehicle) may be evaluated in real-time in physical hardware, with the implemented solution being the more appropriate of the two methods at a given time.

Depending on the severity of the traction steer event, the system may determine that additional, supplemental compensation for the traction steer is required (step 64). Accordingly, the system may implement a supplemental engine torque reduction technique (step 66). The method 50 then ends (step 68), although in some embodiments, the method 50 may continue indefinitely to monitor wheel speeds and accordingly compensate for any traction steer that occurs.

As one skilled in the art will appreciate, other techniques of compensation for traction steer may be implemented in place of, or in addition to, the aforementioned application of brake pressure. For example, in some embodiments, the vehicle may be equipped with a torque-vectoring differential. Such a torque-vectoring differential is a differential with the capability of distributing torque to either axle shaft in whatever proportion is desired at a given time. If a traction steer event is determined, the system may direct the torque-vectoring differential device to alter the distribution of torque to the respective axle shafts in order to eliminate the traction steer event.

Returning to step 58, the system may compare a variety of operational parameters of the vehicle to determine whether a traction steer event has begun to occur. The system may monitor dynamic parameters such as drive axle torques and steering rack loads.

Drive axle torque refers to a rotational force in the drive axle. Drive axle torque bias refers to an unequal side-to-side distribution of drive axle torque due to friction within the differential that transmits power from the transmission to each of the drive axles of the vehicle. The determination of drive axle torque and corresponding bias to one side of the vehicle may be used to identify which of the vehicle's axles has more torque. Such identification may be one means of determining when a traction steer event is imminent. A torque sensor may be positioned on the vehicle. Such a torque sensor may be located in or near a differential, halfshaft, hub, or wheel of the vehicle. In another embodiment, a strain gauge may be positioned on the vehicle (e.g., on or near the drive axles or wheels) and configured to measure drive axle torques.

Such sensors, gauges, or other load measuring devices can measure current torques applied to each side of the vehicle. These current torque measurements may then be compared against expected torque measurements, based on operating characteristics of the vehicle such as vehicle speed. For example, based on a current vehicle speed, steering angle, and engine torque output, an expected drive axle torque (for a particular side of the vehicle) may be stored in the system's memory. Based on data received from sensors, gauges, or other load measuring devices on the vehicle, the system may identify a current drive axle torque which is above a predetermined threshold. In other words, in that instant, a certain degree of torque is being delivered to the undesired side of the vehicle. Such a determination may be used solely, or in combination with additional determinations of the vehicle state, that a traction steer event has begun to occur.

The analysis of steering rack loads may also provide an indicator of a traction steer event. When a traction steer event occurs, the unequal drive torque biased toward the undesired front tire will generate unequal moments about the steering axes of the vehicle. These moments generate forces in the tie rods that, in turn, result in a net force in the steering rack or linkage. The magnitude and direction of the steering rack force indicates the direction and force with which the vehicle is self-returning towards (e.g., straight ahead or deviating from the intended path).

Steering rack forces may be measured directly or estimated through one of various means. In a first example, a steering rack load may be estimated by measuring hydraulic pressure in the cylinder of a hydraulic steering system. Pressure sensor may be placed on or near the steering rack to measure hydraulic pressure acting on a piston in the hydraulic steering rack. The respective rack force may be calculated by multiplying the pressure on the piston by the applicable area of the piston. The current rack force may then be compared against an expected rack force. Again, the expected rack force may be predetermined based on a variety of factors, such as vehicle speed or steering angle.

In a second example of measuring steering rack forces, the steering rack load may be estimated using a voltage or current in an electric power steering (EPS) motor or controller. For a given motor speed, an electric motor's torque output is dependent on the voltage and current applied to the motor. For example, the addition of more current or more voltage for a given motor results in the production of additional torque. This torque is transmitted to the steering rack through some mechanical means (usually through a pinion shaft, through a series of gears that transfer the torque to the steering column, or through gears or belts that transmit the torque to the steering rack). Knowing the means of transmission and the frictional losses associated with them, the relationship between the motor operating condition (torque/voltage/current) and the steering rack force can be established and measured.

In a third example of measuring steering rack forces, the steering rack load may be measured through the use of load cells. Load cells are a common term to refer to a strain gauge. Many strain gauges utilize a Wheatstone bridge electrical circuit. These load cells may be applied to a tie rod, or otherwise associated with the steering system of the vehicle. Small deformations in the rod due to loading causes the resistance in the Wheatstone bridge circuit to change. The tie rod may be calibrated such that the relationship between the change in resistance and the load applied to the tie rod is known. As a result, the gauge can be used to measure a force in the tie rod or other component of the steering system.

In a fourth example of measuring steering rack forces, the steering rack load may be estimated through the use of one or more steering column torque sensors applied to the vehicle. Using a typical rack and pinion steering gear as an example, the steering torque is transmitted to the pinion which has a known effective diameter where its teeth mesh with those of the rack. A torque in the column results in a force in the rack or vice versa. The relationship between the rack force and column torque can be determined through the use of the following equation:

$$T = R*F - L \qquad (1),$$

where T refers to the column torque, R refers to the pinion radius, F refers to the rack force, and L refers to friction losses.

Measurement of steering rack load according to any one of the foregoing examples may proceed according to method 50 step 58 (FIG. 2), where a current estimation or measurement of steering rack load is compared with an expected steering rack load. Again, if a particular current steering rack load exceeds a predetermined threshold, such a result may be used solely, or in combination with other indicators, such as the aforementioned drive axle torque parameters, to determine whether a traction steer event has begun to occur. Additional parameters may include throttle position, steer angle, steer rate, and yaw velocity. Such parameters may be measured through the use of sensors. For example, a sensor located at or near the gas pedal may measure a throttle position. Steer angle may be measured by a sensor placed at or near the steering column. Yaw velocity may be measured using a yaw sensor. Each of the foregoing parameters may be used in a variety of combinations with other parameters to determine whether a traction steer event has begun to occur.

In one embodiment, expected parameter values may be stored in a table as part of memory 16 or 18 on controller 12 (FIG. 1) or elsewhere. A processor such as CPU 14 (FIG. 1) may compare current measured parameters to the predetermined parameters stored in the table. For example, for a particular throttle position and steering wheel angle, certain predetermined steering system forces would be found in the table as expected values. If the current and expected values differ beyond a threshold, the processor determines that a traction steer event has begun to occur.

Returning to step 62 of method 50 (FIG. 2), once a traction steer event is detected, the computer may apply brake pressure to one of the vehicle's front brakes in order to slow down a faster rotating wheel. Slowing the faster rotating wheel allows the differential to better distribute a torque bias to the slower rotating wheel, which eliminates undesired distribution of torque. The reduction or elimination of this undesired distribution of torque thereby reduces or eliminates traction steer. Alternatively and as previously described, the computer may apply brake pressure to the slower rotating wheel. Application of brake pressure to the slower rotating wheel may result in torque being diverted to the brake system and delivered to the ground. The system may evaluate the potential effectiveness of either method and select the more appropriate brake pressure application at a given time for a given set of circumstances.

Depending upon the severity of the traction steer event (for example, if the system senses that traction steer is reduced but not eliminated), the system may call for supplemental correction techniques. In one embodiment, the system reduces engine torque on an on-demand basis. For example, the amount of engine torque reduction implemented may correspond to the severity of the traction steer event. In one embodiment, the transmission may be hydraulically regulated to reduce torque supplied to one or more wheels.

Use of the foregoing techniques provides a novel and effective approach for determining when a traction steer event has occurred, and for compensating for the same. The method can address conditions which previous approaches do not take into account, and provide better analysis under real dynamic conditions.

Various aspects of the foregoing description may be embodied as a computer program product. The computer program product may comprise computer-readable storage mediums, such as the aforementioned memory 16 and 18 (FIG. 1), or other mediums such as a digital versatile disk (DVD), compact disk (CD) and the like. The storage medium may have computer-readable program code portions, such as the above instructions, stored therein. The instructions may include executable portions for carrying out various steps or various embodiments of the above description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for detection and active compensation of a traction steer event, comprising:
   comparing a first wheel speed of a first driven wheel with a second wheel speed of a second driven wheel to determine whether a wheel slip condition has occurred;
   when a wheel slip condition is determined to have occurred, comparing a current operating state of a vehicle to an expected operating state of the vehicle to determine if a traction steer event has occurred; and
   when a traction steer event is determined to have occurred, selectively applying brake pressure to the first or second driven wheel to compensate for the traction steer event.

2. The method of claim 1, wherein selectively applying brake pressure to the first or second driven wheel includes selectively applying brake pressure to the first or second driven wheel having a higher wheel speed.

3. The method of claim 1, wherein selectively applying brake pressure to the first or second driven wheel includes selectively applying brake pressure to the first or second driven wheel having a lower wheel speed.

4. The method of claim 1, wherein the step of comparing a current operating state of the vehicle to an expected operating state of the vehicle includes comparing a current steering rack force against an expected steering rack force.

5. The method of claim 4, wherein the step of comparing a current steering rack force against an expected steering rack force includes determining a current steering rack force by measuring a hydraulic pressure in a cylinder of a hydraulic steering system to estimate a rack load.

6. The method of claim 4, wherein the step of comparing a current steering rack force against an expected steering rack force includes determining a current steering rack force by measuring a voltage or current associated with an electric power steering system (EPS).

7. The method of claim 4, wherein the step of comparing a current steering rack force against an expected steering rack force includes determining a current steering rack force by measuring a tie rod load using a load cell.

8. The method of claim 4, wherein the step of comparing a current steering rack force against an expected steering rack force includes determining a current steering rack force by estimating a rack load using at least one steering column torque sensor.

9. The method of claim 1, wherein the step of comparing a current operating state of a vehicle to an expected operating state of the vehicle includes comparing a current vehicle throttle position with an expected vehicle throttle position.

10. The method of claim 1, wherein the step of comparing a current operating state of a vehicle to an expected operating state of the vehicle includes comparing a current steer angle with an expected steer angle.

11. The method of claim 1, wherein the step of comparing a current operating state of a vehicle to an expected operating state of the vehicle includes comparing a current steer rate of the vehicle with an expected steer rate.

12. The method of claim 1, wherein the step of comparing a current operating state of a vehicle to an expected operating state of the vehicle includes comparing a current yaw velocity of the vehicle with an expected yaw velocity of the vehicle.

13. The method of claim 1, further including, if a traction steer event is determined to have occurred, reducing an engine torque to supplement applying brake pressure.

14. The method of claim 1, further including, if a traction steer event is determined to have occurred, directing a torque-vectoring differential to distribute an engine torque to compensate for the traction steer event.

15. A system for detecting and compensating for a traction steer event, comprising:
   means for comparing a first wheel speed of a first driven wheel with a second wheel speed of a second driven wheel to determine whether a wheel slip condition has occurred;
   when a wheel slip condition is determined to have occurred, means for comparing a current operating state of a vehicle to an expected operating state of the vehicle to determine if a traction steer event has occurred; and
   when a traction steer event is determined to have occurred, means for selectively applying brake pressure to the first or second driven wheel to compensate for the traction steer event.

16. The system of claim 15, wherein the means for comparing a current operating state of a vehicle to an expected operating state of the vehicle includes means for comparing a current steering rack force against an expected steering rack force.

17. The system of claim 15, wherein the means for comparing a current operating state of a vehicle to an expected operating state of the vehicle includes means for comparing a current vehicle throttle position with an expected vehicle throttle position or means for comparing a current steer angle with an expected steer angle.

18. The system of claim 15, wherein the means for comparing a current operating state of a vehicle to an expected operating state of the vehicle includes means for comparing a current steer rate of the vehicle with an expected steer rate or means for comparing a current yaw velocity of the vehicle with an expected yaw velocity of the vehicle.

19. The system of claim 15, further including, if a traction steer event is determined to have occurred, means for reducing an engine torque to supplement an application of brake pressure.

20. A computer program product for detecting and compensating for a traction steer event, the computer program product comprising a computer-readable storage medium having computer-readable program code portions stored therein, the computer-readable program code portions comprising:
   a first executable portion configured to compare a first wheel speed of a first driven wheel with a second wheel speed of a second driven wheel to determine whether a wheel slip condition has occurred;
   a second executable portion configured to compare a current operating state of a vehicle to an expected operating state of the vehicle to determine when a traction steer event has occurred, when a wheel slip condition has been determined to have occurred; and
   a third executable portion configured to compare a current operating state of a vehicle to an expected operating state of the vehicle to determine when a traction steer event has occurred, when a traction steer event has been determined to have occurred.

* * * * *